RE 28,556
T 781 721

United St

Re. 28,556

Swoager

Reissued Sept. 23, 1975

[54] MULTI-PURPOSE VEHICLE FOR USE UNDERGROUND

[75] Inventor: Jon R. Swoager, Imperial, Pa.

[73] Assignee: Automation Equipment, Inc., Imperial, Pa.

[22] Filed: Nov. 19, 1974

[21] Appl. No.: 525,223

Related U.S. Patent Documents

Reissue of:

[64] Patent No.: 3,811,290
Issued: May 21, 1974
Appl. No.: 299,354
Filed: Oct. 20, 1972

U.S. Applications:

[63] Continuation-in-part of Ser. No. 241,975, April 7, 1972, Pat. No. 3,793,966.

[52] U.S. Cl. ..... 61/63; 61/45 R
[51] Int. Cl.[2] ..... E21D 15/44
[58] Field of Search ..... 61/63, 45 R, 45 D, 84; 299/18, 31; 173/22, 23; 105/161, 364

[56] References Cited

UNITED STATES PATENTS

| | | | |
|---|---|---|---|
| 876,542 | 1/1908 | Haight | 173/23 |
| 2,053,665 | 9/1936 | Hirschberg | 173/22 |
| 2,316,672 | 4/1943 | Curtis et al. | 173/22 X |
| 2,711,634 | 6/1955 | Joy | 61/45 D |
| 3,136,534 | 6/1964 | Howard | 61/84 |
| 3,268,258 | 8/1966 | Kegel | 299/18 |
| 3,501,040 | 3/1970 | Martelee | 105/75 X |

*Primary Examiner*—Dennis L. Taylor
*Attorney, Agent, or Firm*—Robert D. Yeager

[57] ABSTRACT

A self-propelled vehicle having independently steerable and suspended wheel assemblies for use in underground excavations. The vehicle includes means for temporarily supporting the roof of an excavation, drilling holes in the roof, and inserting bolts therein. The vehicle also includes scoops mounted at each end with a conveyor joining the scoops, thus giving the machine a self-loading capacity. The application also discloses a method for systematically installing roof bolts.

4 Claims, 21 Drawing Figures

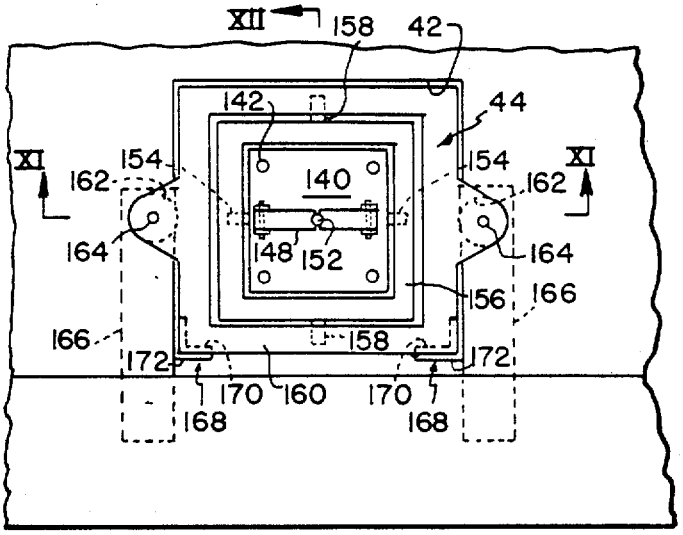
XII Fig. 10
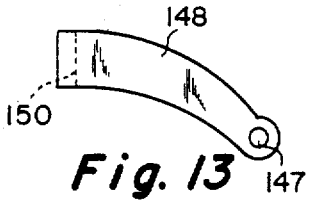
Fig. 13
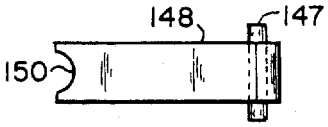
Fig. 14
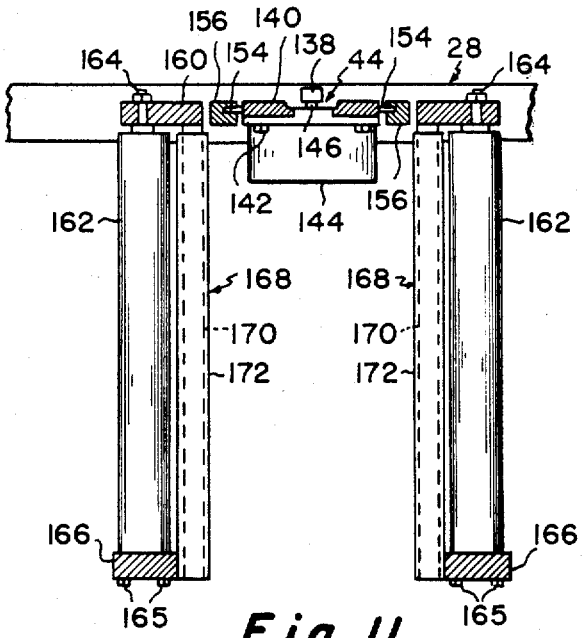
Fig. 11
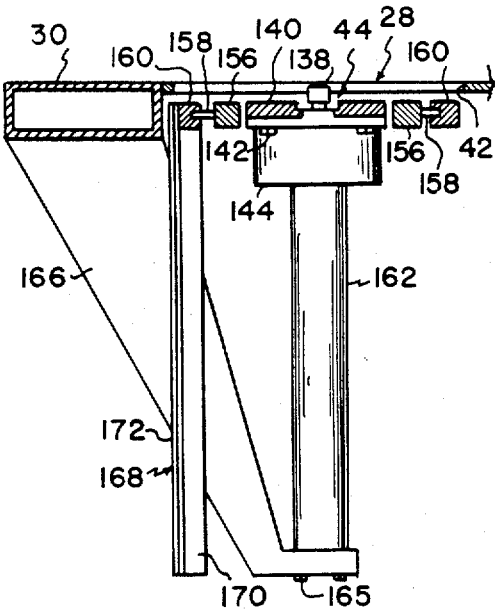
Fig. 12

MULTI-PURPOSE VEHICLE FOR USE UNDERGROUND

Matter enclosed in heavy brackets [ ] appears in the original patent but forms no part of this reissue specification; matter printed in italics indicates the additions made by reissue.

CROSS REFERENCE TO RELATED APPLICATIONS

This is a continuation-in-part of U.S. Ser. No. 241,975, filed Apr. 7, 1972, U.S. Pat. No. 3,793,966 [.] *and a reissue of U.S. Pat. No. 3,811,290, issued May 21, 1974.*

BACKGROUND OF THE INVENTION

1. Field of the Invention

This invention relates to a vehicle for use underground; more particularly, to a self-propelled, multipurpose vehicle for use in underground mining operations.

2. Description of the Prior Art

Underground mining operations, particularly in the coal industry, have come under increased scrutiny by governmental agencies and the general public because of the safety hazards presented to workers in the mines. Some of these hazards are inherent in the nature of underground mining itself; for example, the threat of a roof cave-in or the possibility of a build-up in gas or dust concentrations in the mine and a resulting explosion. Other of the hazards are created by inadequacies in equipment being used at the present time in an attempt to meet governmental regulations imposed because of the existence of the inherent hazards. A brief description of a typical underground mining operation carried out in today's coal mines will bring these equipment insufficiencies into focus:

A coal mine comprises a network of shafts and rooms excavated along the course of coal veins. Headroom in these shafts and rooms is ordinarily restricted depending upon the thickness of the particular vein and may vary between about four to 10 feet. Thus, low profile equipment is essential in most mines.

A machine known as a continuous miner is the primary piece of equipment used to extract coal from the vein. This machine works at the fresh, exposed face of the coal vein, loosening the coal by the action of movable augers. Mechanical arms mounted on the machine sweep the loosened coal to the rear of the machine as it progresses forwardly against the face. The bulk of this coal is picked up by suitable means and conveyed out of the mine. As the continuous mining machine advances, it creates an expanse of ceiling or roof which is unsupported and subject to collapse. Accordingly, the forward travel of a continuous miner under an unsupported roof is restricted by government regulation. When the appropriate limit of forward travel is reached, the continuous miner must retreat from the face of the mine until the roof has been suitably supported.

Roof support is achieved in most coal mines by installing metal bolts in the roof at spaced intervals fixed by government regulation. The required spacing of bolts will depend on the width of the room but ordinarily is four feet both transversely and longitudinally. Installation of a roof bolt involves first the drilling of a hole in the roof, the insertion of a bolt having an expander of any well known type at the end, and finally torqueing the bolt to a predetermined value. Roof bolt installation is complicated by the fact that government regulations prohibit mine personnel from working under an unsupported roof. Further problems are created during the roof bolting operation by government regulations requiring that any loose debris left by the continuous miner be cleaned from the mine floor as soon as possible.

Present coal mine practice involves the use of a machine known as a roof bolter for installing roof bolts. Generally, a roof bolter comprises a mobile platform having a movable boom extending therefrom. A drill head is mounted at the end of the boom and is controlled by a workman standing nearby. Usually, the workman actuates the drill with one hand and guides the shank of the upwardly moving drill bit with the other hand. The proximity of the workman to the drill has been the source of many serious accidents in the mines; for example, the drill bit may break or a drill bit extension may become disconnected and, in either case, strike the workman standing nearby. The drilling operation usually causes dust and debris to fall from the roof, hindering the workman's vision and otherwise endangering his health and safety.

Similar dangers are created by the existing method of inserting roof bolts. In most cases, the required length of the roof bolt is such that the bolt must be bent to start it into the hole drilled in the roof. The bending operation is done manually and with relatively little effort by the workman because of the flexibility of the metal used in conventional roof bolts. The head of the bolt is then inserted in the socket of the drill head and the bolt is driven home by the upward stroke of the drill head. Again the workman must control the movement of the drill head with one hand and guide the bolt with the other, thereby subjecting him to the danger of being hit by an errant bolt. Also, the insertion of the bolt causes dust and debris to fall from the roof, thereby creating the same hazards discussed above with respect to the drilling operation.

Following the insertion of bolts in an unsupported roof, conventional practice calls for the roof bolter to be withdrawn so that a machine with a scoop mounted on the front may enter the newly supported area to remove loose debris in accordance with regulations discussed above. Once the scoop is loaded, the machine must be backed away from the mine face until it reaches a cross-shaft where it can turn around and continue its movement to an unloading site. All of these operations are time consuming and reduce the productivity of the mine.

The present invention overcomes the disadvantages and objections associated with present roof bolting equipment and methods. Not only are personnel safety hazards markedly reduced, but also more efficient operating procedures are afforded by the present invention.

SUMMARY OF THE INVENTION

The present invention provides a self-propelled vehicle for use in underground excavations having a floor and a ceiling, the vehicle comprising: a frame; wheel assemblies supporting the frame, the wheel assemblies being independently suspended and steerable; a body supported on the frame; first lifting means supported by the frame for raising the body above the frame; a plurality of rotatable chuck assemblies disposed within the body and adapted to engage a workpiece for insertion into the ceiling; second lifting means supported by the body and engaging the chuck assemblies for raising the chuck assemblies above the body; and means mounted on the frame for contacting said ceiling above the vehicle and the floor below to support the ceiling against collapse. Preferably, each chuck assembly provided in the present invention is gimbal-mounted on its corresponding second lifting means and has pivotally mounted thereon a plurality of dogs for releasably engaging the workpiece. It is also preferable that the means for contacting the ceiling and the floor to support the ceiling against collapse comprises hydraulic jacks adapted for independent actuation.

Preferably, the present invention further comprises: a pair of movable scoop containers mounted on the frame at opposite ends thereof; and a reversible conveyor supported by the frame and positioned to transport material from one of the containers to the other.

The present invention further provides in a self-propelled vehicle for use in underground excavations, the vehicle including a frame supported by wheel assemblies, the improvement comprising: a pair of movable containers mounted on the frame at opposite ends thereof; and a reversible conveyor supported by the frame and positioned to transport material from one of the containers to the other.

The present invention further provides in a wheeled vehicle, an independent suspension and steering system for each wheel comprising: a frame member pivotally mounted at its inboard end to the vehicle undercarriage and including at its outboard end a trunion member; a mounting plate pivotally mounted within the trunion; a wheel assembly rotatably mounted to the outboard side of the mounting plate; and positioning means operably connected between the mounting plate and the outboard side of the vehicle undercarriage.

The present invention further provides a method for installing roof bolts in an underground mine room having an unsupported ceiling, said method comprising: (A) advancing a vehicle by remote control into a first position within the room; (B) remotely positioning jacking means mounted on the vehicle into engagement with a portion of the ceiling above the vehicle and a portion of the floor below the vehicle; (C) drilling a plurality of spaced holes in the ceiling above the vehicle while the vehicle is in its first position; (D) installing bolts in the holes drilled in step (C) while the vehicle is in its first position; (E) removing the jacking means from engagement with the ceiling and the floor; (F) advancing the vehicle by remote control further into the room on an acute angle from the direction of advance of step (A) to place the vehicle in a second position; (G) repeating steps (B) through (E) inclusive; (H) retreating the vehicle by remote control in a direction opposite from the direction of advance of step (A) to place the vehicle in a third position, the third position being longitudinally intermediate between the first position and the second position; and (J) repeating steps (B) through (E) inclusive.

Other advantages of the present invention will become apparent from a consideration of the following detailed description taken with the accompanying drawings.

BRIEF DESCRIPTION OF THE DRAWINGS

FIG. 10 is an enlarged top elevation of a chuck assembly;

FIG. 11 is a section taken along line XI—XI of FIG. 10 showing a chuck assembly, lift cylinders and guides;

FIG. 12 is a sectional view taken along line XII—XII of FIG. 10;

FIG. 13 is a side elevation of a dog as shown in FIG. 10;

FIG. 14 is a top elevation of the dog of FIG. 13;

DESCRIPTION OF THE PREFERRED EMBODIMENT

Figure 4:
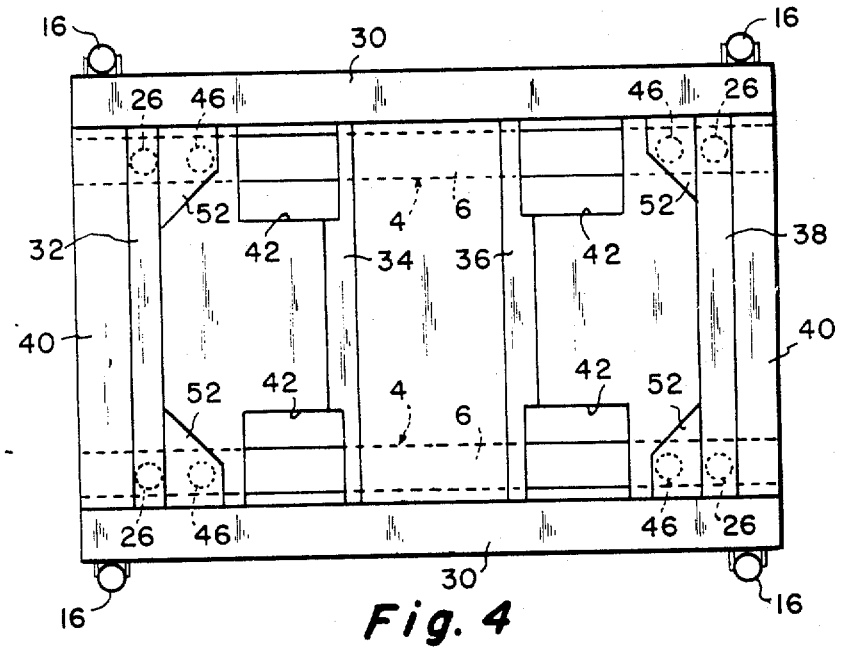
FIG. 4 is a diagrammatic top elevation of the main frame and body of the machine of the present invention.
Figure 5:
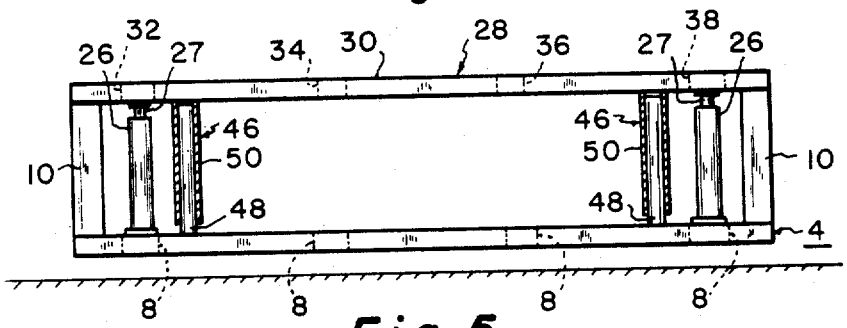
FIG. 5 is a side elevation of the main frame and body shown in FIG. 4.
Figure 6:
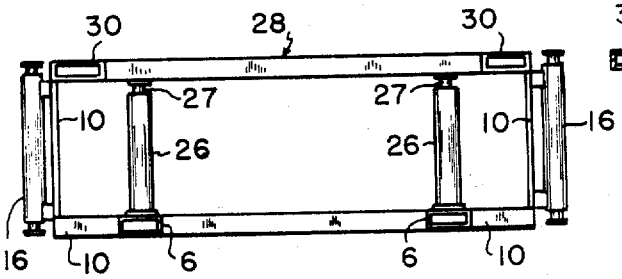
FIG. 6 is an end elevation of the main frame and body showing the roof support cylinders and the lift cylinders for the body.

Referring to FIGS. 1 through 7, there is shown a multi-purpose, wheel-supported machine 2 for use in underground mines. Machine 2 includes a main frame designated by the reference numberal 4. Frame 4 includes frame sections 6 (see FIG. 4) spaced away from and parallel to the longitudinal center line of machine 2. Frame sections 6 may be of box-type construction, as shown (FIG. 6), or of any other suitable construction. Frame sections 6 are connected by a number of transverse frame separators 8 (FIG. 5), which may be made from heavy gauge channel or box stock. Extending outwardly and upwardly from frame sections 6 at each corner of frame 4 are L-shaped stiffeners 10 (FIGS. 5 and 6). Frame 4 is supported above the ground by four wheel assemblies generally designated by the numeral 12.

Mounted at each of the four corners of frame 4 by means of brackets 14 extending transversely from frame sections 6 are roof support cylinders 16. Roof support cylinders 16 are conventional, double-acting, telescoping, hydraulic cylinders having upper and lower pads 18 and 20, respectively, attached to their respective upper and lower piston rods 22 and 24 (see FIG. 18). Mounted inboard of roof support cylinders 16 and supported directly on frame sections 6 are four upright lift cylinders 26. Lift cylinders 26 carry piston rods 27 and are of the conventional single-acting type.

A body, generally designated by the reference numeral 28, is supported above frame 4 by stiffeners 10 and lift cylinders 26. Body 28 includes a pair of spaced body sections 30 arranged outboard of frame sections 6 and parallel to the longitudinal center line of machine 2. Body sections 30 may be of box-type construction, as shown, or other suitable construction. Body sections 30 are connected by transverse body support members 32, 34, 36 and 38, respectively, which may be made from box stock or other suitable construction. Body 28 is completely enclosed at the top and sides with plate stock 40 (see FIG. 9) except for openings 42 formed in the top of body 28 (see FIG. 4) to permit passage of chuck assemblies 44, described in detail below. As shown in FIG. 4, suitable cut-outs are made in body support members 34 and 36 to form openings 42.

Figure 7:
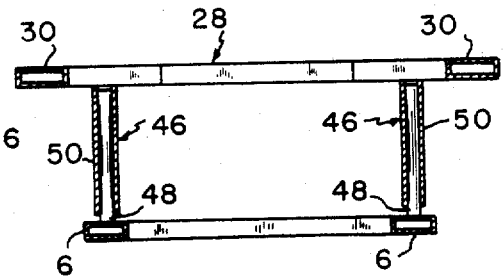
FIG. 7 is an end elevation of the main frame and body showing the slide posts for the body.

As will be described hereinbelow, body 28 is adapted to be raised above its support points by lift cylinders 26. To counteract side loads and assure smooth upward movement of body 28, during that lifting operation, four telescoping slide posts 46 are provided adjacent each of lift cylinders 26. As best shown in FIGS. 5 and 7, slide posts 46 each include a vertical inner post 48 mounted to its associated frame section 6 and a concentric outer post 50 depending vertically from each of four gussets 52 which are mounted at the junctures of body sections 30 with body support members 32 and 38. Inner post 48 and outer post 50 are dimensioned to make inner post 48 easily slidable within outer post 50.

Mounted at each end of machine 2 are identical scoops 54. Each scoop 54 includes a trapezoidal-shaped bottom portion 56, and a pair of vertical side walls 58 mounted to the non-parallel sides of bottom portion 56. Scoops 54 are arranged with respect to machine 2 so that the side walls 58 of each scoop converge from the lip of the scoop toward its throat 59. Each scoop 54 is pivotally mounted in opposed transverse trunions (not shown) mounted inboard of frame sections 6 and carrying suitable bearing surfaces. Each scoop 54 is movable about its transverse mounting axis by means of a pair of hydraulic scoop cylinders 60 pivotally connected between main frame 4 and the outer side of each side wall 58.

Figure 9:
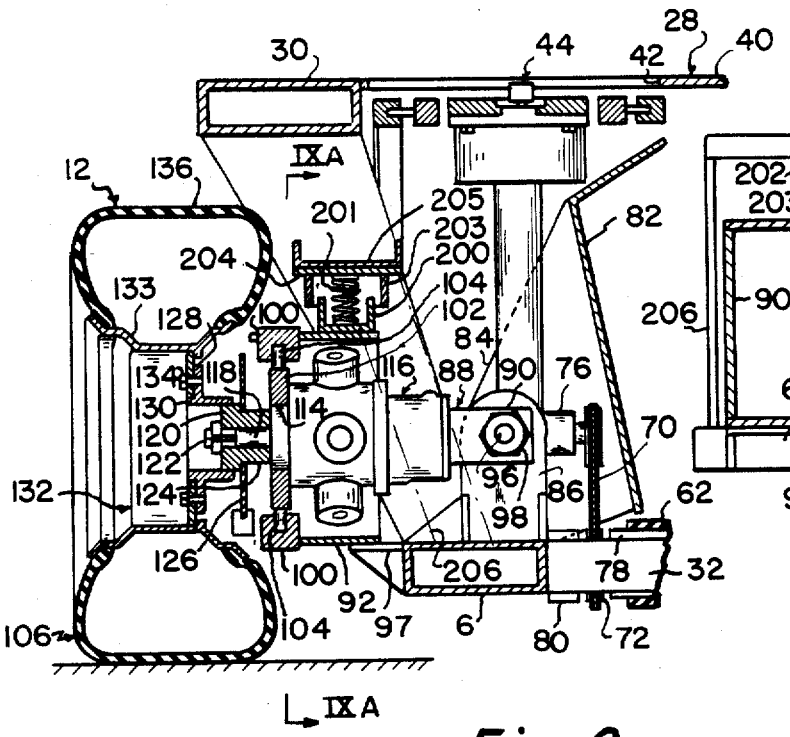
FIG. 9 is a sectional view taken through the wheel mounting assembly of FIG. 8 and one of the chuck assemblies shown in FIG. 1.
Figure 9A:
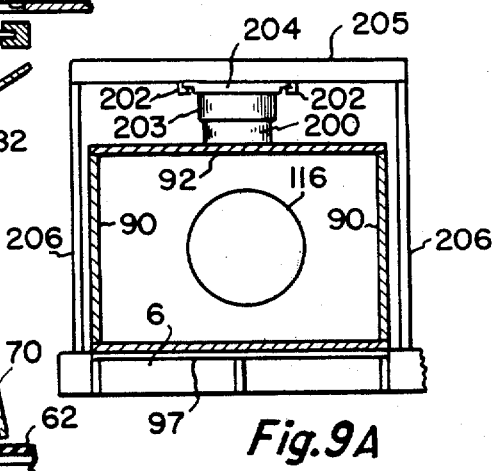
*FIG. 9A is a sectional view taken along line IX—IX of FIG. 9;*

Connecting the throats 59 of scoops 54 is a conveyor 62. Conveyor 62 is a conventional endless belt conveyor and is adapted to move material from the throat of one scoop to the throat of the other. Conveyor 62 passes over drive rollers 64 and 66, which are rotatably mounted between frame sections 6 at their left and right ends, respectively. Drive rollers 64 and 66 are driven through a chain 70 and sprocket 72 arrangement by reversible hydraulic motors 74 and 76, respectively. Additional idler rollers 78 for supporting conveyor 62 (see FIG. 9) may be mounted on trunions 80 between frame sections 6 at intermediate points between drive rollers 64 and 66. A conventional conveyor belt tightening device (not shown) is installed on the conveyor to adjust the tension of the belt. As shown in FIG. 9, side guards 82 are provided on each side of conveyor 62 to prevent spillage of material being conveyed. Side guards 82 are mounted to frame sections 6 by means of brackets 84.

Figure 8:
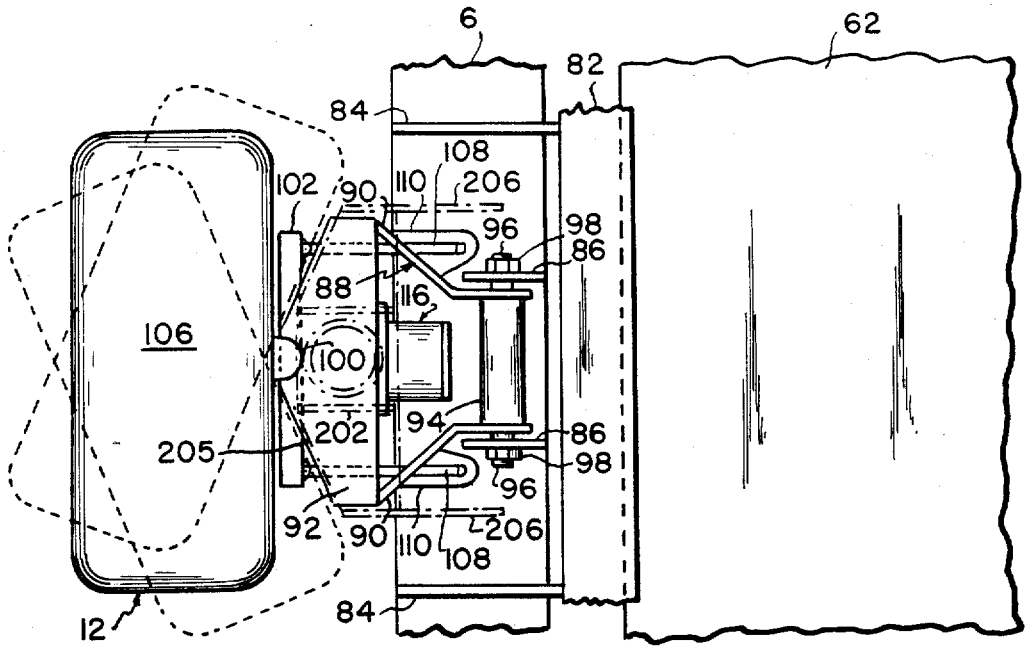
FIG. 8 is a partial top elevation showing the wheel mounting assembly of the machine of the present invention and the wheel positioning cylinders.

Referring to FIGS. 8 and 9, the wheel assemblies 12 will now be described in detail. A pair of vertical carriage plates 86 are provided for each wheel assembly 12. Preferably, plates 86 are mounted upon frame section 6 and are parallel to each other. Each pair of plates 28 has a pair of oppositely aligned holes (not shown). Pivotal movement of wheel assembly 12 is provided by a transverse A-frame 88 having a pair of offset arms 90. A trunion 92 is provided at the outboard extension of arms 90 and a cylindrical pin holder 94 is provided at the inboard extension of arms 90. Preferably arms 90 are parallel to each other at the inboard extension of the A-frame 88, and are spaced apart and adapted for engagement between carriage plates 86. The inboard extension of arms 90 each include an opening (not shown) oppositely aligned from the other. Cylindrical holder and spacer member 94 preferably includes a sleeve (not shown) made of teflon or the like material. Holder 94 is of a length substantially equal to the spacing between support arms 90 at their parallel inboard extensions. Holder 94 is rigidly mounted between arms 90 with its openings therethrough in communication with the openings in arms 90. A-frame 88 is positioned so that the openings in arms 90 and, thus, holder 94 are aligned with the oppositely aligned holes in plates 86. A pin 96 is then inserted through the openings in plates 88, holder 94 and arms 90. Pin 96 is preferably of sufficient length to extend beyond carriage plate 88 in its fully inserted position, and is threaded at both of the extended portions. Pin 96 is retained within the assembly by means of nuts 98 secured to the threaded end portions of pin 96. The pivotal mounting of wheel assembly 12 just described permits the entire assembly to move vertically to conform with the terrain over which machine 2 passes. Downward movement of wheel assembly 12 about its pivotal mounting is limited by stop 97 extending from frame section 6.

*At the inboard end of the top portion of trunion 92 is mounted a lower spring housing 200. Lower spring housing 200 is adapted to engage and hold suspension spring 201. A pair of oppositely facing L-shaped rail members 202 are transversely mounted to horizontal support member 205 and extend, preferably, between plate 102 and the outboard side of motor 116. Horizontal support member 205 is, in turn, supported by a pair of upstanding support members 206 which are mounted to frame 6. This particular supporting arrangement for horizontal support member 205 is made necessary by the fact that body 28 and its associated body sections 30 are movable and thus not suitable for supporting the suspension assembly for wheel 106. An upper spring housing 203 is secured to a spring mounting plate 204. Upper spring housing 203 preferably has an interior diameter slightly larger than the outer diameter of housing 200 to permit housing 200 to move within the upper housing 203 during flexing of spring 201. At its upper end, spring 201 is mounted to plate 204. Plate 204 includes a pair of lands for engaging the horizontally inwardly extending lands of rails 202 to permit the upper spring assembly to transversely move along rails 202. This permits the wheel as-*

*sembly 12 to pivot about pin 96 as described above and yet retain a suspension mounting.*

At the outboard end of trunion 92 and along its vertical center line are mounted upper and lower female bearing members 100. A vertical motor mounting plate 102 having a pair of upper and lower male bearing members 104 engaging, respectively, female bearing members 100 is positioned within trunion 92. Plate 102 is, therefore, adapted to pivot about the vertical center line of the respective bearings. Since the wheel 106 is mounted to plate 102, it will also pivot with the plate about a vertical axis.

Each wheel 106 is independently steerable through a total angle of 45°, 22.5° on either side of the transverse axis passing through the center of the wheel. Steering is provided by a pair of hydraulic steering cylinders 108 each pivotally mounted at one end to a mounting bracket 110 affixed to A-frame 88 and at the other end to motor mounting plate 102. Actuation of steering cylinders 108 cause wheel 106 to pivot about a vertical axis within the 45° range indicated by dashed lines in FIG. 8. Suitable hydraulic control valves (not shown) allow for lengthening and shortening of cylinders 108 as wheel 106 moves vertically about its pivotal mounting to frame 4.

Mounting plate 102 is provided with an opening 114. A hydraulic motor 116 is mounted at the inboard side of plate 102. Motor 116 is preferably a low speed, high torque hydraulic motor having a stationary housing or rotating shaft. Motor 116 includes a shaft 118 which passes through opening 114. Wheel 106 includes an annular support hub 120 mounted to shaft 118 by means of bolt 122. Support hub 120 includes an annular land 124 at the inboard end which is adapted to support and position brake disc 126. Support hub 120 also includes an outboard extension to which is mounted a circular wheel mounting member 128. Member 128 is mounted so as to provide the hub with an annular land 130 between the mounting member 128 and the outboard end of the hub. A wheel member 132 having a circumferential rim member 133 is bolted to mounting member 128 by means of bolt 134; wheel member 132 is adapted to be nested upon land 130. A tire 136 is mounted in a conventional manner on rim member 133. Unlike most rubber-tired vehicles used at present in underground mines, tire 136 may be solid rather than pneumatic because the wheel suspension system just described absorbs the forces normally transmitted by solid tires.

Referring now to FIGS. 10–14, chuck assemblies 44 will be described in detail. Chuck assemblies 44 serve a dual purpose in the operation of machine 2; they grip the drill bits necessary to drill holes in the mine roof and they hold the heads of roof bolts for insertion into the drilled holes. Thus, the chuck itself (shown diagrammatically in FIG. 11 and designated by the reference numeral 138) must be readily adaptable to grip the shank of a drill bit and securely hold the head of a bolt. Chuck 138 is secured to a square horizontal mounting plate 140. Mounted to the bottom of plate 140 by means of bolts 142 is drive means 144 which imparts rotation to chuck 138 through a shaft 146. Drive means 144 may take the form of a hydraulic motor and includes a conventional torque limiting device. Pivotally mounted on the top surface of plate 140 by means of pins 147 are dogs 148. The free end of each dog 148 has a semi-circular slot 150 adapted to embrace a portion of the shank of a workpiece, either a drill bit or roof bolt. As shown in FIG. 10, two dogs 148 are positioned on opposite sides of chuck 138 and when pivoted into place their slots frictionally hold the shank of a workpiece 152 in the vertical position. Additional dogs 148 may be mounted on plate 140 if desired.

Plate 140 has a pair of aligned lugs 154 extending from opposite sides of plate 140 along a centerline thereof. Lugs 154 fit into trunions (not shown) mounted on a square gimbal member 156 positioned in planar relationship with plate 140 and equidistant from its edges. In turn, gimbal member 156 has a pair of aligned lugs 158 extending from opposite sides of gimbal member 156 on a center line of plate 140 which is perpendicular to the center line of lugs 154. Lugs 158 fit into trunions (not shown) mounted on an outer chuck support member 160 also positioned in planar relationship with plate 140 and gimbal member 156 and equidistant from the edges of gimbal member 156. The effect of these two gimbal mountings is to permit mounting plate 140 (and thus chuck 138) to seek the true horizontal regardless of the orientation of chuck support member 160. In this way, a workpiece held in chuck 138 will always assume a vertical position. Chuck assembly 44 is provided with suitable means (not shown) to automatically lock the gimbal mountings when drive means 144 is energized.

Chuck support member 160 is supported by a pair of vertical hydraulic lift cylinders 162 and secured to the piston rods thereof by means of bolts 164. Lift cylinders 162 are of the conventional single-acting type and are secured at their lower ends by means of bolts 165 to brackets 166 depending from body sections 30 on either side of chuck assemblies 44.

Lift cylinders 162 are adapted to raise chuck assembly 44 above the top surface of body 28. To assure smooth upward movement of chuck assembly 44 when lift cylinders 162 are actuated, a pair of vertical guide posts 168 are provided to extend between the bottom of chuck support member 160 and brackets 166 which support lift cylinders 162. Each guide post 168 includes a first L-shaped member 170 depending from its point of attachment at one corner of chuck support member 160 and a second L-shaped member 172 dimensioned to receive first L-shaped member 170 and secured at its lower portion to bracket 166.

Figure 1:
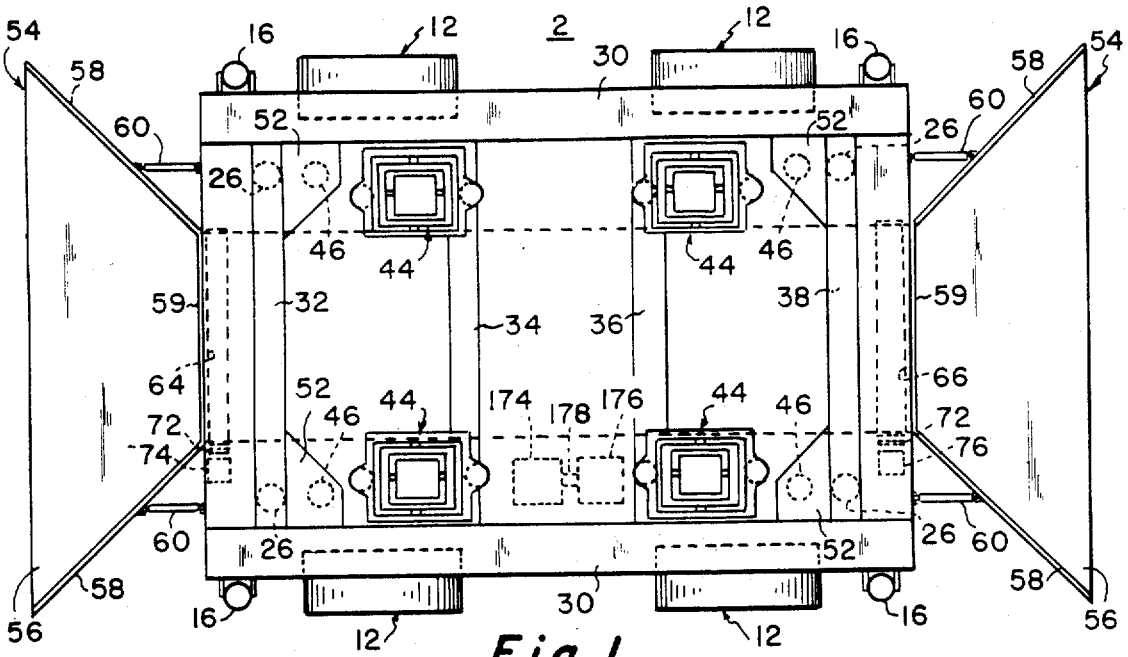
FIG. 1 is a top elevation of the machine of the present invention.
Figure 2:
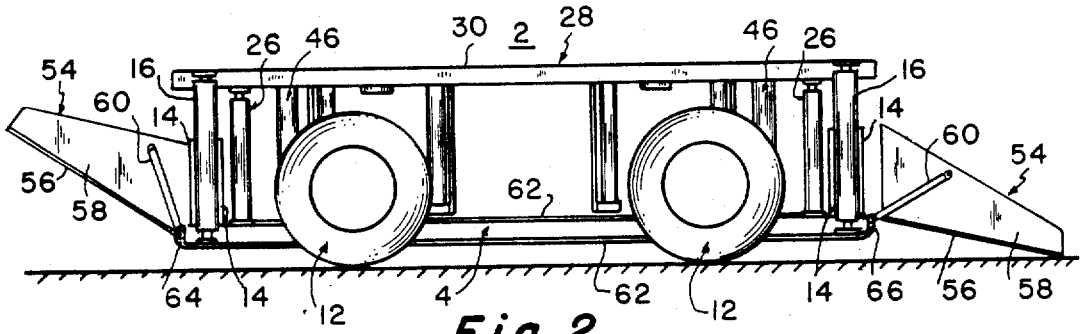
FIG. 2 is a side elevation of the machine of FIG. 1.
Figure 3:
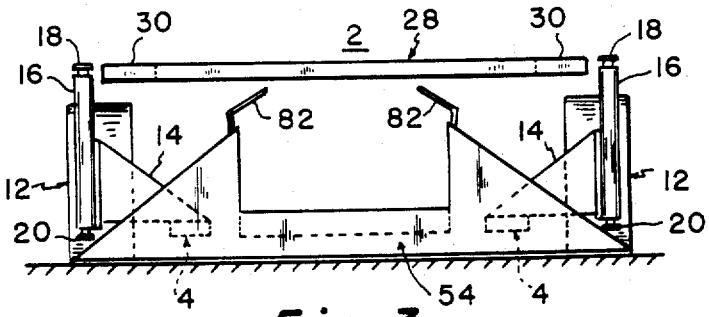
FIG. 3 is a right-hand end elevation of the machine of FIG. 1.

As shown in FIG. 1, machine 2 is provided with an electric motor 174 suitably mounted on frame 4. Motor 174 may receive its power from a trailing cable or a battery. In certain instances, it may be preferable to omit electric motor 174 and substitute therefor a diesel engine. Electric motor 174 is used to drive a hydraulic pump 176 by means of a rotating shaft 178. Pump 176 furnishes hydraulic fluid under pressure to drive hydraulic motors 116 and 76.

Referring now to FIGS. 15–20, the operation of machine 2 within an underground coal mine will now be described: As stated above, when the continuous miner withdraws from the face of the mine, it leaves an expanse of unsupported roof above. If the roof is of such composition as to make it particularly susceptible to collapse, vertical timbers may be wedged between the roof and the floor to provide temporary support while the continuous miner is operating. In any event, government regulations prevent workmen from moving into a room under an unsupported roof to install roof bolts. Accordingly, the machine of the present invention is brought into position at the threshold of the room.

The machine 2 is fitted with four chuck assemblies located in two rows spaced four feet apart, with four feet between assemblies in each row. The purpose of this arrangement is to comply with the usual government regulation that roof bolts be placed at spaced intervals of four feet both longitudinally and transversely. A greater or lesser number of chuck assemblies than four may be employed to suit local conditions.

Figure 15:
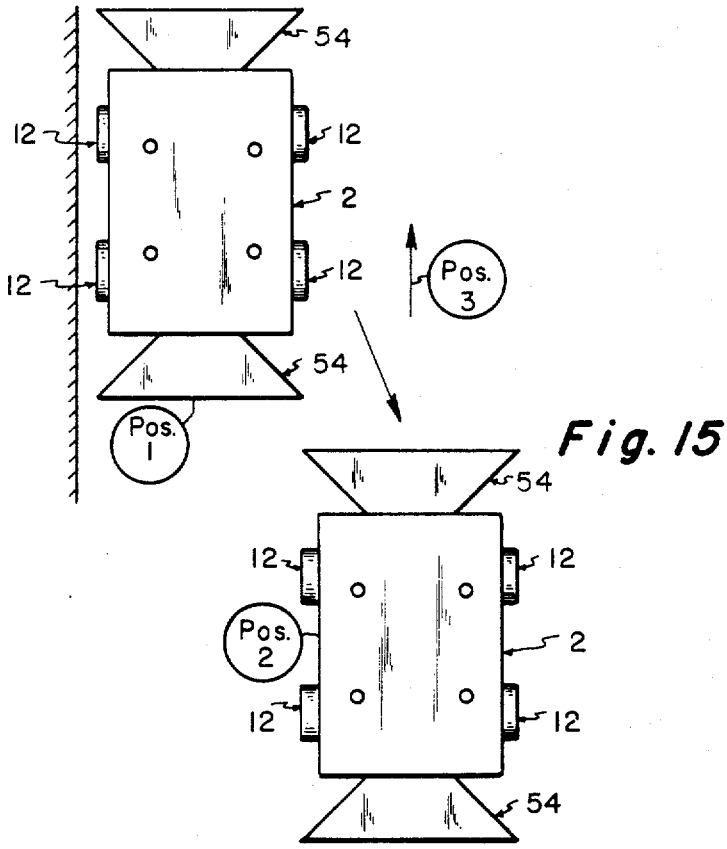
FIG. 15 is a diagrammatic view showing a drilling pattern which may be employed with the machine of the present invention.
Figure 16:
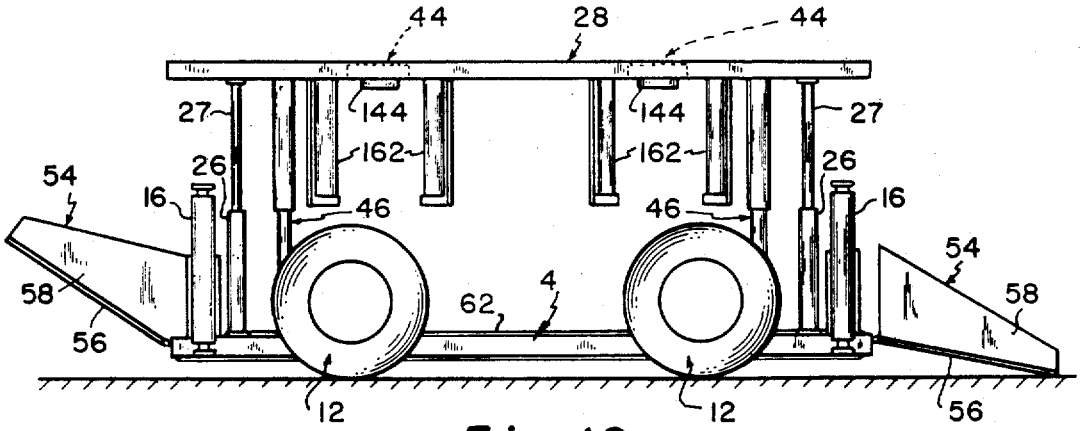
FIG. 16 is a side elevation similar to FIG. 2 but with the body raised.
Figure 17:
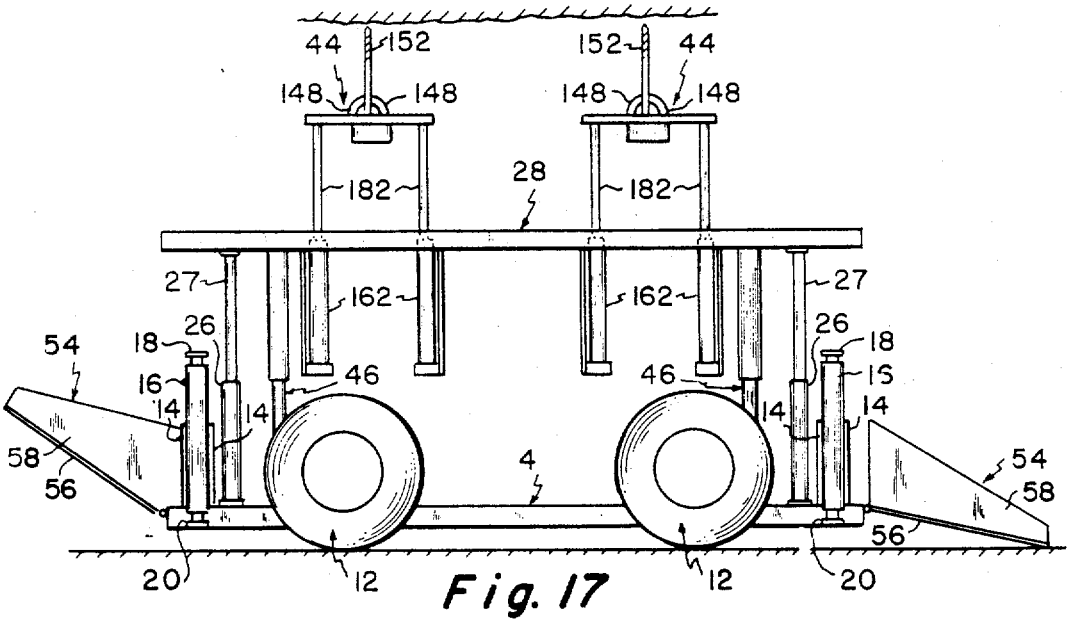
FIG. 17 is a side elevation showing the raised chuck assemblies following the position reached by the body in FIG. 16.

Government regulations also require that roof bolts be installed within a specified distance from the longitudinal walls of the room. Thus, the first position of machine 2 within the unsupported room will generally be closely adjacent a side wall as shown in FIG. 15. Position 1 shown in the Figure is reached by tramming the machine by remote control into the room, the machine operator being safely situated to the rear under a supported roof. If timers have been erected, the machine will simply knock them down as it advances; the displaced timers will be removed after the roof is supported.

Prior to advancing machine 2 into Position 1, lift cylinders 26 and 162 are placed in their retracted (lowermost) positions and drill bits are installed in chuck assemblies 44. As the machine advances to Position 1, the operator remotely actuates the forward scoop 54 to place its lip on the mine floor (see FIG. 16) so that any coal debris in the machine's path is gathered up by the scoop. At the same time, the rear scoop 54 is placed in a raised position. Conveyor 62 is also actuated so that when the coal debris gathered by the forward scoop is pushed rearwardly by the advance of machine 2, it falls onto conveyor 62 and is carried to rear scoop 54 and deposited therein. Thus, the combination of the two scoops and the conveyor serves to make machine 2 self-loading and capable of carrying a payload far in excess of a conventional front scoop loading machine. It may be desirable to link the drive means of conveyor 62 with the drive means of the machine to take advantage of the low speed, high torque motor operation provided for in the machine drive means.

Figure 18:
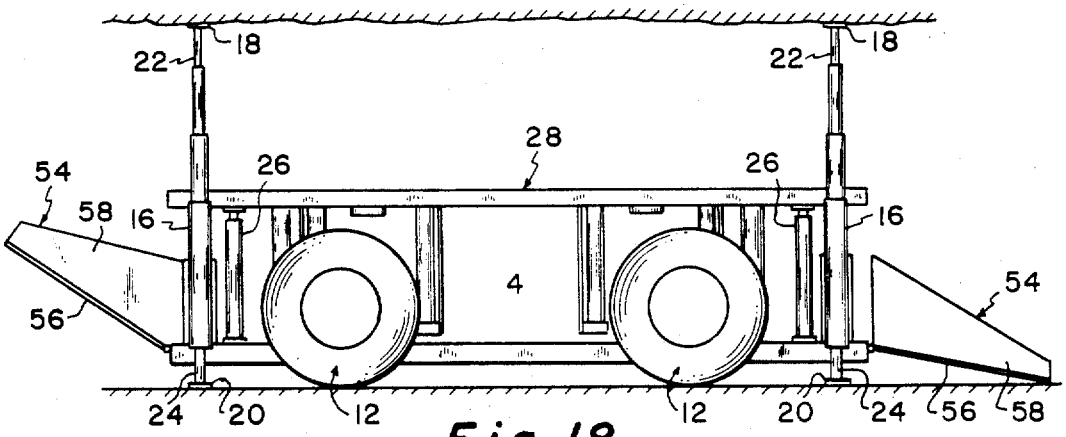
FIG. 18 is a side elevation similar to FIG. 2 but showing the roof support cylinders in an extended position.
Figure 19:
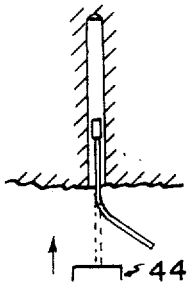
FIG. 19 is a diagrammatic view of the insertion of a roof bolt.

When machine 2 reaches Position 1, the operator remotely actuates roof support cylinders 16 to cause them to extend into engagement with the roof and the floor as best shown in FIG. 18. Once roof support cylinders are positioned, the operator is free to move under the roof since it is now supported. With the drill bits already in place in chuck assemblies 44, the operator actuates lift cylinders 26. In unison, lift cylinders 26 extend their associated piston rods 27 upwardly and cause body 28 to lift away from its points of support on frame 4. Smooth upward movement of body 28 is assured by the cooperative sliding action of slide posts 46.

As body 28 moves upwardly, it carries with it chuck assemblies 44 and their associated lift cylinders 162. The gimbal-mountings provided in chuck assemblies 44 enable the upwardly moving drill bits to seek the true vertical regardless of the orientation of frame 4. When the drill bits strike the roof, the operator actuates drive means 144 to rotate the drill bits; automatically, the gimbal-mountings on chuck assemblies 44 are locked. Dogs 148 firmly hold the drill bits in place, making any manual steadying or guiding of the drill bits by the operator unnecessary. Thus, the simultaneous drilling of four correctly spaced holes begins.

When piston rods 27 reach the limit of their travel (see FIG. 16), the operator actuates lift cylinders 162 to commence the upward movement of chuck assemblies 44, guided by guide posts 168. The piston rods 182 of lift cylinders 162 extend upwardly to permit the drilling operation to progress. If necessary, the operation can retract chuck assemblies 44 and insert drill bit extensions to obtain the necessary depth in the holes being drilled. One of the advantages of the drilling sequence just described is that it effectively denies the operator any occasion to place his hand near the chuck assemblies 44 during drilling and thereby reduces the possibility of accident and injury.

When holes of correct depth are drilled, chuck assemblies 44 are lowered by bleeding lift cylinders 162. Then body 28 is lowered onto its points of support by frame 4 by bleeding lift cylinders 26. The operator may then remove the drill bits and any extensions thereof from chuck assemblies 44.

The next step is the insertion of roof bolts into the drilled holes. Since the presence of machine 2 beneath the holes usually prevents insertion of straight bolts into the holes, the operator usually will have to bend each bolt manually, get it started into the hole, and bend it back so that the bolt head may be placed in a suitable socket in chuck assembly 44. This operation is shown diagrammatically in FIG. 19. When all bolts are in position and being held in chuck assemblies 44 by dogs 148, the operator again sequentially actuates the lift mechanism as described above to drive the bolts home. A torque sensing mechanism in each drive means 144 permits the operator to automatically torque each bolt to the correct value.

When the bolts are secure, the operator lowers both lifting mechanisms and replaces the drill bits in chuck assemblies 44 in readiness for the next drilling operation. The operator next retracts roof support cylinders 16 to the position shown in FIG. 16. While standing under the newly supported roof, the operator actuates each pair of steering cylinders 108 on wheel assemblies 12 to cause each wheel to pivot approximately 22.5° to the left (see FIG. 15). The operator trams machine 2 into Position 2 shown in FIG. 15 while operating the scoop and conveyor as before. The entire drilling sequence just described is repeated and the operator then trams machine 2 in the direction indicated by the arrow in FIG. 15 to reach Position 3. For a machine configured with four chuck assemblies spaced on four foot centers, the distance between Position 2 and Position 3 will be 12.0 ft., assuming a 22.5° crab between Position 1 and Position 2. Further movements of machine 2 to complete the bolting pattern may be varied to suit local conditions.

When roof bolting has been completed, machine 2 may be used to complete the scooping up of debris from the room floor in the manner described above. The versatility of the present invention in this regard eliminates the need for a separate scoop machine, and the time required to withdraw a bolting machine and being in a scoop machine. The effect of the combination roof-bolter and scoop of the present invention is therefore synergistic.

Figure 20:
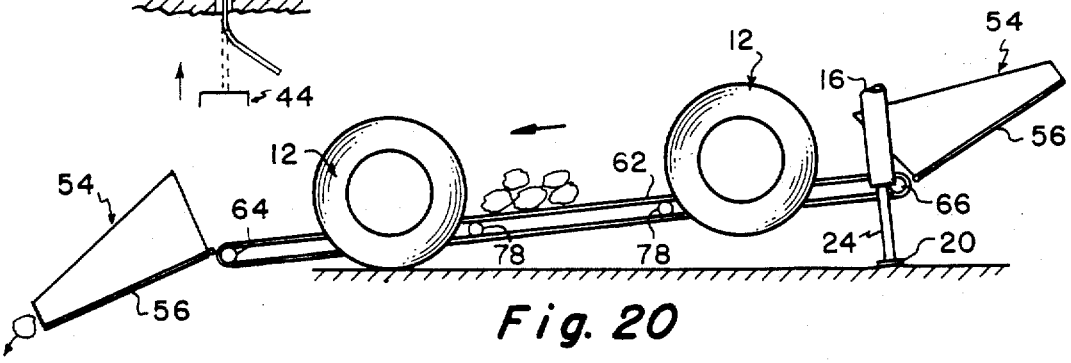
FIG. 20 is a diagrammatic view showing the unloading of the conveyor.

After scooping up debris and loading its rear scoop and conveyor to capacity, machine 2 may be moved to an unloading site at the rear of the mine without being turned around. The unloading of machine 2 usually may be accomplished by lowering the rear scoop into a bin and actuating conveyor 62. If necessary, however, the pair of roof support cylinders 16 at the front of the machine may be actuated sufficiently to tilt conveyor 62 toward the unloading bin as shown in FIG. 20.

What is claimed is:

1. A self-propelled vehicle for use in underground excavations having a floor and a ceiling, said vehicle comprising:

a frame;

wheel assemblies supporting said frame, said wheel assemblies being independently suspended and steerable;

a body supported on said frame;

first lifting means supporting by said frame for raising said body above said frame;

a plurality of rotatable chuck assemblies disposed within said body and adapted to engage a workpiece for insertion into said ceiling;

second lifting means supported by said body and engaging said chuck assemblies for raising said chuck assemblies above said body; and means mounted on said frame for contacting said ceiling above said vehicle and said floor below to support said ceiling against collapse.

2. A vehicle as recited in claim 1 wherein:

said chuck assemblies are gimbal-mounted on said second lifting means.

3. A vehicle as recited in claim 1 wherein:

each of said chuck assemblies includes a plurality of dogs pivotally mounted on said chuck assembly for releasably engaging said workpiece.

4. A vehicle as recited in claim 1 wherein:

said means for contacting said ceiling and said floor to support said ceiling against collapse comprises hydraulic jacks adapted for independent actuation.

* * * * *